US011551660B1

United States Patent
Baker et al.

(10) Patent No.: US 11,551,660 B1
(45) Date of Patent: Jan. 10, 2023

(54) MANAGEMENT OF BACKGROUND NOISE WITHIN A PASSENGER CABIN OF A VEHICLE

(71) Applicant: Zoox, Inc., Foster City, CA (US)

(72) Inventors: Daniel David Baker, San Francisco, CA (US); Songmao Chen, Foster City, CA (US); Nicholas Nakjoo Kim, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/375,992

(22) Filed: Jul. 14, 2021

(51) Int. Cl.
| | |
|---|---|
| *G10K 11/178* | (2006.01) |
| *H04R 5/027* | (2006.01) |
| *B60R 11/02* | (2006.01) |
| *B60W 50/00* | (2006.01) |

(52) U.S. Cl.
CPC ...... *G10K 11/1785* (2018.01); *B60R 11/0247* (2013.01); *B60W 50/00* (2013.01); *G10K 11/17821* (2018.01); *H04R 5/027* (2013.01); *B60W 2050/0059* (2013.01); *G10K 2210/1282* (2013.01); *H04R 2499/13* (2013.01)

(58) Field of Classification Search
CPC .............. B60W 20/17; F02M 35/1244; G10K 11/1752; G10K 11/175; G10K 2210/1282; G10K 11/1787; G10K 11/1785; H03G 3/32

See application file for complete search history.

(56) References Cited

U.S. PATENT DOCUMENTS

| | | | |
|---|---|---|---|
| 10,978,039 B2 * | 4/2021 | Seffernick | B60N 2/002 |
| 2014/0198919 A1 * | 7/2014 | Ballnik | B60W 20/17 381/56 |

* cited by examiner

*Primary Examiner* — Kile O Blair
(74) *Attorney, Agent, or Firm* — EIP US LLP

(57) ABSTRACT

Techniques are described in which sensor data is used to determine one or more of background noise or occupancy associated with a passenger cabin of a vehicle. The sensor data, in turn, is used to determine an operating state for one or more components of the vehicle (e.g., pumps, compressors, fans, blowers, etc.) such that an amount of background noise within the passenger cabin is reduced (e.g., when a passenger/occupant is present). In various examples, the operating state of the component may operate in a different, though louder, state (e.g., higher efficiency, greater power, etc.) when an occupant is not present or proximate the component.

20 Claims, 8 Drawing Sheets

| | HVAC SYSTEM | | | | SUSPENSION SYSTEM |
|---|---|---|---|---|---|
| | COMPRESSOR | PUMP | FANS | BLOWER | PUMP |
| NOISE AND MAXIMUM SPEED IN FIRST OPERATING STATE | 32 dBA 1500 RPM | 32 dBA 1800 RPM | 32 dBA 900 RPM | 32 dBA 1200 RPM | 32 dBA 1800 RPM |
| NOISE AND MAXIMUM SPEED IN SECOND OPERATING STATE | 45 dBA 8500 RPM | 42 dBA 6500 RPM | 50 dBA 2400 RPM | 55 dBA 3800 RPM | 39 dBA 5000 RPM |

FIG. 5

MANAGEMENT OF BACKGROUND NOISE WITHIN A PASSENGER CABIN OF A VEHICLE

BACKGROUND

Ancillary components of a vehicle may generate unwanted noise within a passenger cabin. Though such noise may be reduced through the use of sound dampening materials, there is a limit to how much can be dampened. Further limiting the noise by constraining one or more components of the vehicle may cause the vehicle to operate inefficiently.

BRIEF DESCRIPTION OF THE DRAWINGS

The detailed description is described with reference to the accompanying figures. The use of the same reference numbers in different figures indicates similar or identical components or features.

FIG. 5 is a table detailing a level of noise within the passenger cabin of the example vehicle generated by components of the vehicle when operating in a first operating state and a second operating state.

DETAILED DESCRIPTION

Figure 1:
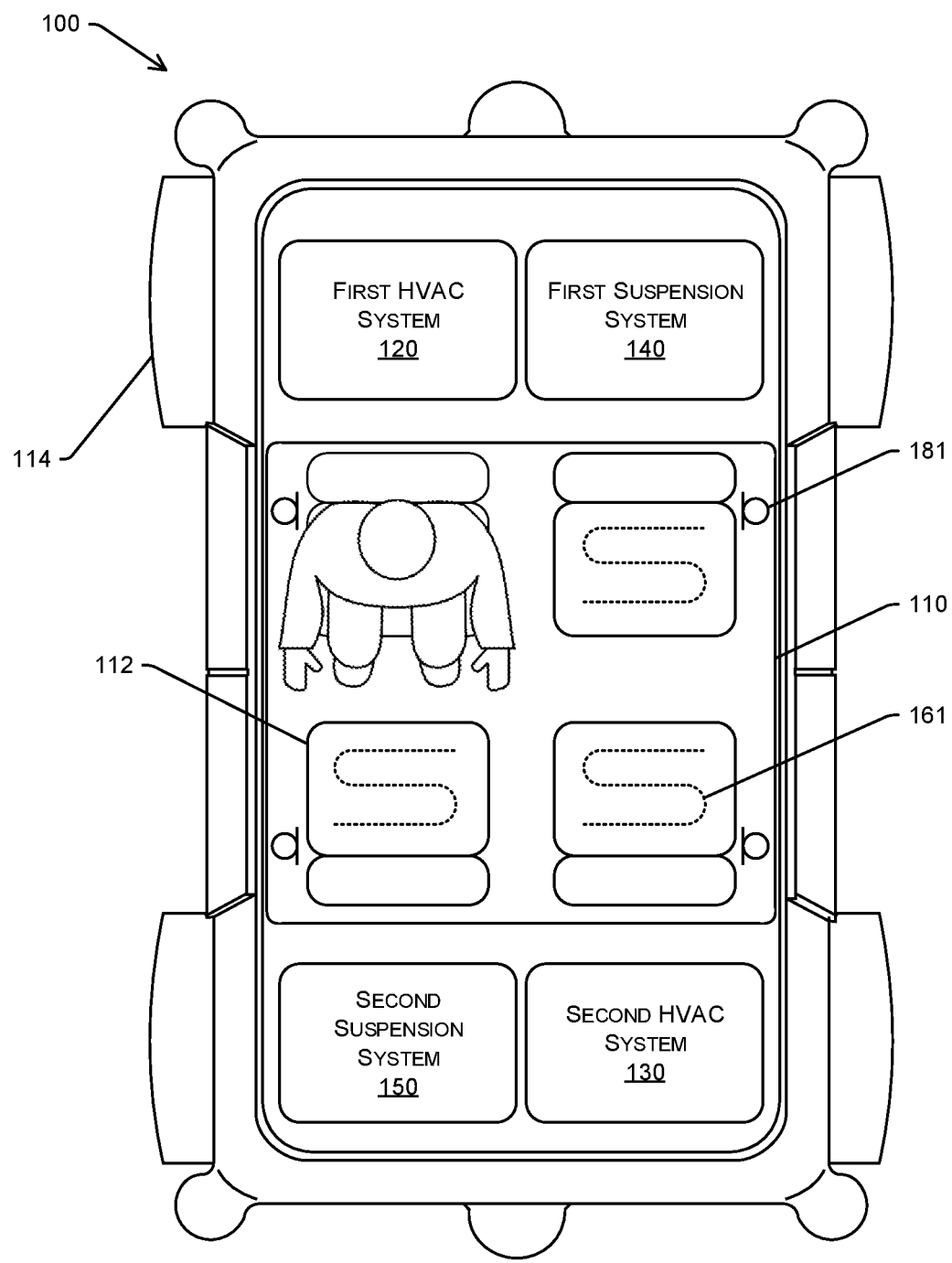
FIG. 1 is a schematic top view of an example vehicle.

This disclosure is directed to the management of background noise within a passenger cabin of a vehicle. Vehicles may comprise components that generate unwanted noise within the passenger cabin. In some instances, the noise generated by a component may be masked by other sources of background noise. For example, in vehicles having an internal combustion engine, the noise generated by a component may be masked by the noise of the engine. In other examples, the noise generated by a component may be masked by music or other audio within the passenger cabin, or by road and/or wind noise, particularly when the vehicle is travelling at relatively high speeds. However, there may be instances when the noise generated by a component is not masked and may be discerned by an occupant of the passenger cabin. For example, in vehicles that are powered at least partially by an electric motor, the noise generated by a component (e.g., a component of an HVAC system) may be discerned by an occupant when the vehicle is travelling at relatively low speeds.

This disclosure is generally directed to a vehicle having a component that is caused to operate in a range of different operating states. In some examples, the component may comprise a number of discrete operating states. In other examples, the component may comprise a continuum of operating states. By way of example, the component may have a different maximum speed in different operating states, and the maximum speed may be adjusted in discrete steps (i.e., discrete operating states) or in gradual increments (i.e., continuum of operating states). The component may generate noise within a passenger cabin of the vehicle. Moreover, the noise generated by the component may have a different sound level in the different operating states.

The operating state of the component may be determined based on data indicative of a background noise within the passenger cabin or occupancy of the passenger cabin. In some examples, the component may be caused to operate in a quieter operating state when, for example, a parameter indicative of background noise within the passenger cabin is less than a threshold. The component may then operate in a louder operating state when the parameter is greater than the threshold. The threshold may then be defined such that noise generated by the component is masked, either wholly or partly, by other sources of background noise. In other examples, the component may be caused to operate in a quieter operating state when, for example, a seat of the passenger cabin proximate the component is occupied. The component may then operate in a louder operating state when the seat proximate the component is unoccupied. In those examples in which the component may operate in a continuum of operating states, the operating state may be determined as a function of the background noise and/or occupancy of the passenger cabin. By way of example, the component may have a different maximum speed in different operating states, and the maximum speed may be defined as a function of a level of the background noise (e.g., the maximum speed may increase in response to an increase in the level of the background noise). In some examples, the operating state of the component (be it one of a discrete set of operating states or a continuum of operating states) may be determined based on a level of the background noise and/or a proximity of an occupant to a component such that the component operates in an optimal operating state (e.g., most efficient, greatest torque, highest output power, etc.) while the noise generated by the component is masked by other sources of background noise.

By determining the operating state of the component based on data indicative of the background noise and/or occupancy within the passenger cabin, the noise generated by the component may be less discernible by an occupant of the passenger cabin, thereby improving acoustic comfort. For example, the component may operate in a quieter operating state when a level of background noise within the passenger cabin is lower or when a seat proximate the component is occupied. The component may operate in a louder operating state when the level of background noise is higher or when the seat proximate the component is unoccupied. As a result, a more optimal performance may be achieved for the component without the additional noise generated by the component adversely affecting the acoustic comfort of an occupant of the passenger cabin.

The vehicle may comprise one or more sensors that output data indicative of one or more of a background noise within the passenger cabin or occupancy of the passenger cabin. In some examples, the sensors may comprise a microphone for sensing a sound pressure inside the passenger cabin. In other examples, the sensors may comprise a plurality of microphones for sensing sound pressures at different locations within the passenger cabin. The sensors may sense a parameter from which the background noise within the passenger cabin may be inferred, estimated or otherwise determined. For example, the sensors may comprise a microphone for sensing a sound pressure outside of the passenger cabin. Road noise and wind noise, which can be significant sources of background noise within the passenger cabin, typically increase with the speed of the vehicle. Accordingly, in other examples, the sensors may comprise a vehicle speed sensor, a wheel speed sensor or other sensor (e.g., GPS device) for sensing a speed of the vehicle. Rain may also be a significant source of background noise within the passenger cabin. Accordingly, the sensors may comprise a rain sensor for sensing the presence and/or the intensity of rain falling onto the vehicle. The surface type of the road on which the vehicle is travelling may also be a contributing factor to background noise. Accordingly, in examples, the sensors may comprise a camera or other image sensor for capturing image data of the road, from which the surface type may be determined using image recognition or the like. In various examples, topographical information of the road surface may be stored and/or retrieved from a map and based on data (e.g., acoustic data, IMU data, suspension data, etc.) acquired from a previous traversal of the road by the vehicle or another vehicle in a fleet of vehicles. In other examples, the vehicle may comprise one or more sensors (e.g., lidar, cameras, radar, time-of-flight, GPS, etc.) that provide geo-location of the vehicle, and data regarding the surface type of the road may be obtained by using the geolocation of the vehicle to index a database (e.g., a map). In further examples, the sensors of the vehicle may sense an occupancy of the passenger cabin. For example, the sensors may comprise a camera, motion sensor, pressure sensor, seatbelt engagement sensor, thermal imager, inertial measurement unit, etc. for sensing whether the passenger cabin is occupied or unoccupied and, in at least some examples, whether a particular seat within the passenger cabin is occupied.

The operating state of a component may be determined based, at least in part, on the identity of an occupant of the passenger cabin. As a result, the management of background noise within the passenger cabin may be tailored to a particular occupant. For example, for one occupant, the operating state may be determined so as to improve acoustic comfort at the potential expense of, say, thermal comfort (should the component form part of an HVAC system) or ride comfort (should the component form part of a suspension system). For another occupant, however, the operating state may be determined so as to improve thermal comfort or ride comfort at the potential expense of acoustic comfort. In examples where the operating state is determined based on thresholds or other criteria, the identity of the occupant may be used to define the thresholds or criteria. In some examples, the operating state of the component may be determined such that background noise within the passenger cabin is less than or equal to a desired noise profile for that occupant.

In some examples, the vehicle may have different drive modes and the operating state of the component may be determined based, at least in part, on the drive mode of the vehicle. In examples, the operating state may be determined such that the noise generated by the component has a different profile in different drive modes. By way of example, the vehicle may comprise a 'quiet mode' in which acoustic comfort is prioritized over ride comfort, and a 'comfort mode' in which ride comfort is prioritized over acoustic comfort. When the vehicle is in the quiet mode, the operating state of a component of the suspension system may be determined so as to reduce noise. As a consequence, however, the suspension of the vehicle may be stiffer. Conversely, when the vehicle is in comfort mode, the operating state of the component may be determined so as to soften the suspension. However, as a consequence, the noise generated by the component may be louder.

The component may comprise one of a compressor, a pump, a fan, or a blower, or any other component or subcomponent of a vehicle. Such components may be significant sources of noise within the passenger cabin. Accordingly, by controlling the operating state of one or more of such components, improvements in acoustic comfort may be achieved. In some examples, the component may form part of a heating, ventilation and air conditioning system ("HVAC"), or a suspension system, or otherwise. In some examples, the operating state may comprise a speed or a speed range of the component. For example, the component may operate at a different speed or over a different range of speeds in different operating states.

This disclosure is also generally directed to a method for managing noise within a passenger cabin of a vehicle. The method may comprise receiving sensor data indicative of background noise within a passenger cabin of a vehicle. The operating state of a component of the vehicle may then be determined based, at least in part, on the sensor data. As noted above, the sensor data may comprise, for example, a sound pressure level inside the passenger cabin. Additionally, or alternatively, the sensor data may comprise a measure (e.g. sound pressure level outside the cabin, vehicle speed, rain intensity, vehicle geolocation) from which the background noise within the passenger cabin may be inferred, estimated or otherwise determined. The method may further comprise receiving additional data indicative of an occupancy of the passenger cabin, and the operating state of the component may be additionally determined based, at least in part, on the additional data.

Example systems and methods are described below in the context of passenger vehicles (e.g., personal vehicles such as cars and trucks, and for-hire vehicles such as taxicabs and shuttles). However, the techniques of the present disclosure are not so limited and may equally be used to manage the background noise in passenger cabins of other vehicles, such as buses, trains, boats and planes.

Figure 2:
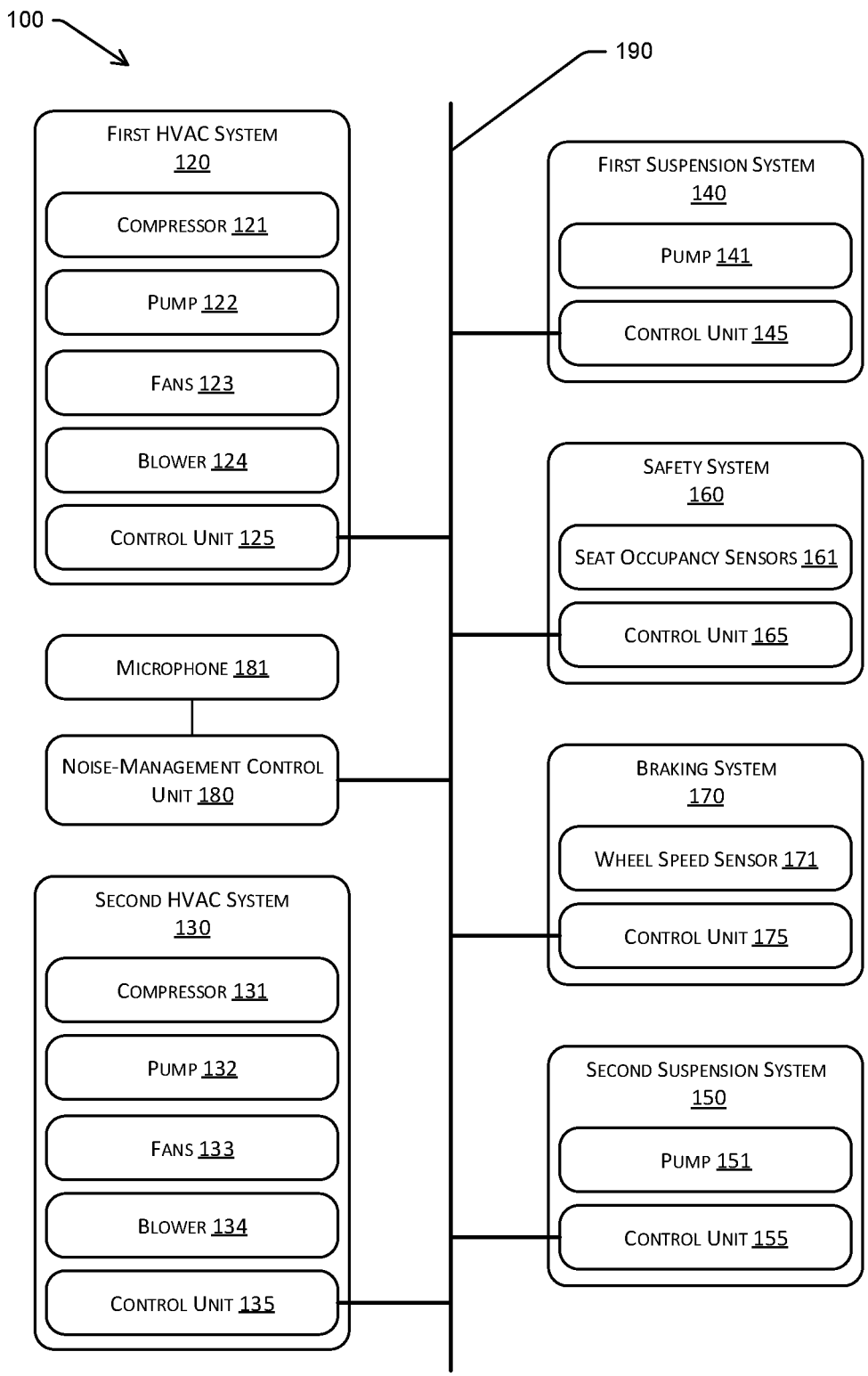
FIG. 2 is a block diagram of systems of the example vehicle.

FIG. 1 is a schematic diagram of an example vehicle 100, and FIG. 2 is a block diagram of systems of the example vehicle 100. The vehicle 100 may be an autonomous vehicle configured to operate according to a Level 5 classification defined by the U.S. National Highway Traffic Safety Administration. This classification describes a vehicle capable of performing all safety-critical functions for an entire trip, without occupants of the vehicle being required to control the vehicle at any time. In other examples, the vehicle 100 may a non-autonomous vehicle, or a fully or partially autonomous vehicle having a different level of classification.

The vehicle 100 may comprise a passenger cabin 110, one or more systems 120-170, one or more sensors 161,171,181, and a noise-management control unit 180.

The passenger cabin 110 may comprise one or more seats 112. In the illustrated example, the passenger cabin 110 comprises four seats 112 arranged as two rows. The rows are located at opposite ends of the passenger cabin 110, with the seats 112 facing one another in a carriage arrangement. In other examples, the passenger cabin 110 may comprise an alternative number and/or arrangement of seats.

The systems of the illustrated example comprise a first heating, ventilation and air conditioning ("HVAC") system 120, a second HVAC system 130, a first suspension system 140, a second suspension system 150, a braking system 170 and a safety system 160. In other examples, the vehicle 100 may comprise fewer, additional and/or alternative systems.

For example, the vehicle 100 may comprise a single HVAC system and/or a single suspension system.

The first HVAC system 120 may be located on one side of the passenger cabin 110 and the second HVAC system 130 may be located on an opposite side of the passenger cabin 110. In the illustrated example, the two HVAC systems 120,130 are identical. However, the HVAC systems 120,130 could conceivably be different.

The HVAC systems 120,130 may comprise a control unit 125,135 and one or more components 121-124,131-134 that can be controlled by the control unit 125,135. In the example illustrated in FIG. 2, the components of the HVAC systems 120,130 include a compressor 121,131 for moving a refrigerant around a first circuit, a pump 122,132 for moving a coolant around a second circuit, one or more fans 123,133 for moving air over heat exchangers of the first and/or second circuits, and a blower 124,134 for discharging conditioned air into the passenger cabin 110. In other examples, the HVAC systems 120,130 may comprise fewer, additional and/or alternative components.

The first suspension system 140 may be located on one side of the passenger cabin 110 and the second suspension system 150 may be located on an opposite side of the passenger cabin 110. The suspension systems 140,150 may be responsible for supporting one or more wheels 114 of the vehicle 100. In the illustrated example, the vehicle 100 comprises four wheels 114. The first suspension system 140 may then support two of the wheels, and the second suspension system 150 may support the other two wheels. Again, in the illustrated example, the suspension systems 140,150 are identical. However, the suspension systems 140,150 could conceivably be different.

The suspension systems 140,150 may comprise a control unit 145,155 and one or more components 141,151 that can be controlled by the control unit 145,155. In the example illustrated in FIG. 2, the components of the suspension systems 140,150 comprise a pump 141,151 for supplying oil to spring-damper assemblies. The suspension systems 140,150 may comprise additional and/or alternative components. By way of example, the suspension systems 140,150 may comprise a compressor for supplying compressed air to the spring-damper assemblies.

The sensors 161,171,181 of the vehicle 100 output sensor data that is indicative of background noise within the passenger cabin 110 and/or occupancy of the passenger cabin 110. In some examples, the sensors may comprise one or more interior microphones for sensing a sound pressure within the passenger cabin 110. In those examples comprising a plurality of interior microphones, the microphones may be placed at different locations within the passenger cabin 110 (e.g., proximate the region of the passenger cabin 110 where an occupant's head may be). In examples, microphones may sense a sound pressure at one or more of the four seating positions within the passenger cabin 110 of the example vehicle 100.

In examples, a sensor may sense a parameter from which the background noise within the passenger cabin may be inferred, estimated or otherwise determined. For example, the sensors may comprise one or more exterior microphones for sensing a sound pressure outside the passenger cabin 110. In another example, the sensors may comprise a vehicle speed sensor, a wheel speed sensor or other sensor (e.g., GPS device) for sensing a speed of the vehicle 100. Road noise and wind noise, which can be significant sources of background noise, typically increase with vehicle speed. Accordingly, by sensing a speed of the vehicle 100, an inference may be made regarding the background noise within the passenger cabin. In a further example, rain can be a significant source of background noise within the passenger cabin. The sensors may therefore comprise a rain sensor for sensing the presence and/or intensity of rain falling onto the vehicle 100. The surface type or surface roughness of the road may also be a contributing factor to background noise. Accordingly, in examples, the sensor may comprise a camera or other image sensor for capturing image data of the road, from which the surface type may be determined. In other examples, the vehicle 100 may comprise one or more sensors (e.g., lidar, cameras, radar, time-of-flight, GPS, etc.) for determining the geolocation of the vehicle, and data regarding the surface type of the road (and/or corresponding background noise as a function of vehicle speed) may be obtained by using the geolocation of the vehicle to index a database (e.g., a map). In examples, the sensors may comprise a sensor for sensing occupancy of the passenger cabin 110. For example, the sensors may comprise a camera, a motion detector, a seat occupancy sensor, seatbelt engagement sensor, thermal imager, inertial measurement unit, etc. for sensing occupancy of the passenger cabin 110.

In the example vehicle 100 illustrated in FIGS. 1 and 2, the sensors comprise a plurality of microphones 181 located within the passenger cabin 110, a wheel speed sensor 171, and a seat occupancy sensor 161 located in one or more of the seats 112. However, as noted, the vehicle 100 may comprise fewer, additional and/or alternative sensors.

The noise-management control unit 180 is responsible for managing background noise within the passenger cabin 110. The noise-management control unit 180 may receive data from the sensors 161,171,181 of the vehicle 100. The noise-management control unit 180 may be connected to and receive data directly from a sensor. Alternatively, the noise-management control unit 180 may receive data from a sensor via an intermediary, such as another control unit. The data output by a sensor may be processed by the intermediary. By way of example, a wheel speed sensor may output a pulsed signal having a frequency that depends on the speed of the vehicle. A control unit or other intermediary may then process the signal and output, to the noise-management control unit 180, a measure or value indicative of the vehicle speed. In the illustrated example of FIG. 2, the noise-management control unit 180 receives data directly from the microphones 181. The wheel speed sensor 171, however, forms part of a braking system 170 of the vehicle 100, and the seat occupancy sensors 161 form part of a safety system 160 of the vehicle 100. The noise-management control unit 180 therefore receives data from the wheel speed sensor 161 and the seat occupancy sensors 171 via the control units 165,175 of the respective systems 160,170.

In response to data received from the sensors 161,171,181, the noise-management control unit 180 may control the operation of one or more components of a system of the vehicle. The noise-management control unit 180 may be connected to a control unit of the system, and the noise-management control unit 180 may control a component of the system by transmitting commands to the control unit. The noise-management control unit 180 may be connected to the control unit of a system via a wired or wireless data bus 190 of the vehicle 100, such as a controller area network bus or ethernet bus. In the example vehicle 100 of FIGS. 1 and 2, the noise-management control unit 180 may control the components of the HVAC systems 120,130 and the suspension systems 140,150.

A component of a system may generate noise within the passenger cabin 110 of the vehicle 100. There may be instances when the noise generated by the component is masked by other sources of background noise. In some examples, the noise generated by the component may be masked by music or other audio played within the passenger cabin 110. In other examples, the noise generated by the component may be masked by road noise, wind noise or noise generated by the powertrain of the vehicle 100, particularly when the vehicle 100 is travelling at relatively high speeds. However, there may be other instances when the noise generated by the component is not masked by other sources and may be discerned by an occupant of the passenger cabin 110. The noise-management control unit 180 may therefore control the operation of the component such that the noise generated by the component is less discernible by an occupant of the passenger cabin 110, thereby improving acoustic comfort.

In examples, the noise-management control unit 180 may control an operating state of a component. In some examples, the component may have a plurality of discrete operating states. In other examples, the component may have a continuum or continuous range of operating states. By way of example, a component may have a different maximum speed in different operating states, and the maximum speed of the component may change in discrete steps (i.e., discrete operating states) or in gradual increments (i.e., continuum of operating states). The component may generate noise within the passenger cabin 110. Moreover, the noise generated by the component may be different when operating in different operating states. For example, the noise generated by the component within the passenger cabin may have a different sound level in different operating states. In some examples, the noise generated by the component may vary over time, and the average sound level or the maximum sound level of the noise generated by the component may be different in different operating states.

In some examples, the component may operate at a different speed or over a different range of speeds in different operating states. For example, the component may comprise a different maximum speed in different operating states. In other examples, the component may operate at a different power (input or output power) or over a different range of powers in different operating states. In further examples, the component may operate at a different torque or over a different range of torques in different operating states. Additionally, or alternatively, the component may comprise a different efficiency or range of efficiencies in different operating states.

In examples, a component may comprise an optimal operating state (e.g., most efficient, greatest torque, highest output power, etc.), and one or more sub-optimal operating states. The level of noise generated by the component may be greater in the optimal operating state. A component may behave optimally, for example, when operating at a particular speed or over a particular range of speeds. The component may then behave sub-optimally when operating at a lower speed or over a lower range of speeds.

The noise-management control unit 180 may control the component in response to data received from one or more of the sensors 161,171,181 of the vehicle 100. As noted above, the sensors 161,171,181 may output data that is indicative of background noise and/or occupancy within the passenger cabin 100. The noise-management control unit 180 may determine, based at least in part on the background noise and/or the occupancy, an operating state of the component. In examples, the noise-management control unit 180 may determine the operating state of the component based, at least in part, on whether the sensor data satisfies a particular criterion or criteria. In examples, the noise-management control unit 180 may determine a first operating state for the component in the event that the sensor data satisfies a first criterion or criteria, and a second operating state in the event that the sensor data satisfies a second criterion or criteria. In other examples, the noise-management control unit 180 may determine the operating state of the component as a function of the sensor data.

In some examples, the sensor data may comprise a sound pressure level inside or outside the passenger cabin. In other examples, the sensor data may comprise a speed of the vehicle. In further examples, the sensor data may indicate a presence or intensity of rain falling on the vehicle. In still further examples, the sensor data may comprise a geolocation of the vehicle or indicate a surface type or a surface roughness of the road on which the vehicle is travelling. In examples, the noise-management control unit 180 may compare the sensor data against one or more thresholds, and determine the operating state of a component based at least in part on the comparison. By way of example, the noise-management control unit 180 may cause the component to operate in a quieter first operating state when a sound pressure level within the passenger cabin or a speed of the vehicle is less than a threshold, and cause the component to operate in a louder second operating state when the sound pressure level within the passenger cabin or the speed of the vehicle is greater than the threshold. The thresholds may be defined such that noise generated by the component may be masked, wholly or partly, by other sources of background noise within the passenger cabin 110. In other examples, the noise-management control unit 180 may determine the operating state of a component as a function of the sensor data. By way of example, a component may have a different maximum speed in different operating states, and the noise-management control unit 180 may vary the maximum speed of the component as a function of the sound pressure level within the passenger cabin and/or the speed of the vehicle (e.g., the maximum speed of the component may be increased in response to an increase in the sound pressure level and/or an increase in the vehicle speed).

In those examples where the noise-management control unit 180 compares the sensor data against one or more thresholds, the noise generated by a component when operating in a louder operating state may continue to be masked by other sources of background noise even when the sensor data subsequently drops below a threshold. Accordingly, rather than causing a component to immediately transition from, for example, a louder operating state to a quieter operating state when the sensor data drops below a threshold, the noise-management control unit 180 may instead analyze the background noise within the passenger cabin in order to determine if noise from the component can be discerned. Noise generated by the component may have a distinct shape or signature in comparison to that generated by other sources of background noise. For example, the noise generated by the component may comprise a peak or peaks at a distinct frequency or frequencies in the power spectrum. Accordingly, the noise-management control unit 180 may determine a peak frequency in the power spectrum of the background noise, and determine the operating state of the component based at least in part on the peak frequency. For example, the noise-management control unit may determine that noise from the component is discernible in the event that the peak frequency has a particular value or lies within a particular range of values. In the event that the noise-management control unit 180 determines that noise from the component can be discerned, the noise-management control unit 180 may cause the component to operate in a quieter operating state, or otherwise to optimize function of the vehicle as a whole.

In some examples, the sensor data may indicate whether the passenger cabin 110 is occupied or unoccupied. Additionally, or alternatively, the sensor data may indicate a location of the occupant. For example, the sensor data may indicate whether a seat 112 within the passenger cabin 110 is occupied or unoccupied. In some examples, the noise-management control unit 180 may cause the component to operate in a quieter operating state in the event that a seat proximate the component is occupied, and to operate in a louder operating state in the event that the seat proximate the component is unoccupied.

The noise-management control unit 180 may receive data from one or more sensors that relates to a particular parameter of the background noise or occupancy, and additional data from one or more additional sensors that relates to an additional parameter. The noise-management control unit 180 may then determine an operating state of the component based on both the data and the additional data. In examples, the noise-management control unit 180 may cause a component to operate in a first operating state in the event that the data and the additional data satisfy first criteria, and to operate in a second operating state in the event that the data and the additional data satisfy second criteria. In examples, the data may be indicative of occupancy within the passenger cabin, and the additional data may be indicative of background noise within the passenger cabin. The noise-management control unit 180 may then cause the component to operate in a quieter first operating state in the event that the passenger cabin is occupied and the background noise is less than a threshold, and to operate in a louder second operating state in the event that either the passenger cabin is unoccupied or the passenger cabin is occupied and the background noise is greater than the threshold. In other examples, the data may indicate whether seats of the vehicle are occupied or unoccupied, and the additional data may indicate sound pressure levels at the seats. The noise-management control unit 180 may then cause the component to operate in a quieter operating state in the event that a seat is occupied and the sound pressure level at the occupied seat is less than a threshold, and to operate in a louder operating state in the event that either the seat is unoccupied or the seat is occupied and the sound pressure at the occupied seat is greater than the threshold. In further examples, the data may comprises a sound pressure level inside the passenger cabin, and the additional data may comprise one or more of a sound pressure level outside the passenger cabin, a speed of the vehicle, an intensity of rain falling on the vehicle, or a geolocation of the vehicle, etc.

The vehicle 100 may comprise a system for determining the identity of an occupant of the passenger cabin. For example, the vehicle 100 may comprise a camera for capturing image data, from which the identity of the occupant may be determined. In another example, the vehicle may receive data regarding the identity of the occupant. For example, the vehicle 100 may be used as a taxicab and the vehicle 100 may receive data regarding the identity of the intended occupant prior to or upon pickup, upon user data input into an app, via wireless communication from a mobile device of the user, and the like. In some examples, the noise-management control unit 180 may determine the operating state of a component based at least in part on the identity of an occupant. As a result, management of noise within the passenger cabin 110 may be tailored to a particular occupant. In some examples, the identity of the occupant may be used to determine a desired noise profile, and the operating state of the component may be determined such that background noise within the passenger cabin is less than or equal to the desired noise profile. In examples where the operating state is determined based on thresholds or other criteria, the identity of the occupant may be used to define the thresholds or criteria. For example, the noise-management control unit 180 may cause the component to operate in a quieter operating state in the event that a sound pressure level within the passenger cabin 110 is less than a threshold, and to operate in a louder operating state in the event that the sound pressure level is greater than the threshold. The identity of the occupant may then be used to define the threshold. The threshold may have a default value that is intended to mask, either wholly or partly, the noise generated by a component. However, an occupant may nevertheless discern noise generated by the component. Alternatively, the occupant may simply desire a quieter ride. In this instance, the threshold may be increased for that particular occupant. By using the identity of an occupant to determine the operating stage of the component, the background noise within the passenger cabin may be better tailored. For example, the acoustic comfort for a particular occupant may be prioritized at the potential expense of, say, thermal comfort (should the component form part of an HVAC system) or ride comfort (should the component form part of a suspension system). Where the vehicle is used as a taxicab, an occupant could conceivably be asked to rate their experience of the trip. The noise profile, thresholds or criteria may then be defined based on the response of the occupant. By way of example, should the occupant respond that the vehicle was noisy then a higher threshold might be used for subsequent trips for that occupant.

The vehicle 100 may have different drive modes and the noise-management control unit 180 may determine an operating state of a component based at least in part on the drive mode of the vehicle 100. The operating state may be determined such that the noise generated by the component has a different profile in different drive modes. That is to say that the operating state of a component may be determined such that, for a particular drive mode, the noise generated by the component over a range of sensor data (e.g., over a range of vehicle speeds) has a noise profile. The component may then be determined such that the noise profile is different for different drive modes. By way of example, the vehicle 100 may comprise a 'quiet mode' in which acoustic comfort is prioritized over ride comfort, and a 'comfort mode' in which ride comfort is prioritized over acoustic comfort. When the vehicle 100 is in the quiet mode, the operating state of the pumps 141,151 of the suspension systems 140,150 may be determined so as to reduce noise. For example, the pumps 141,151 may operate at a lower speed or over a lower speed range. However, as a consequence of operating at a lower speed, the suspension of the vehicle 100 may be stiffer. By contrast, when the vehicle 100 is in comfort mode, the operating state of the pumps 141,151 may be determined so as to soften the suspension. For example, the pumps 141,151 may operate at a higher speed or over a higher speed range. However, as a consequence of operating at a higher speed, the noise generated by the pumps 141,151 may be louder. The vehicle 100 may comprise additional and/or alternative drive modes. By way of example, the vehicle 100 may comprise a 'thermal mode' in which thermal comfort within the passenger cabin 110 is prioritized over acoustic comfort. In this example, the operating states of one or more components of the HVAC systems 120,130 may be determined based on the selected drive mode.

A system of the vehicle 100 may choose to ignore or override a command received from the noise-management control unit 180. For example, in the example vehicle illustrated in FIGS. 1 and 2, the suspension systems 140,150 comprise pumps 141,151 for supplying oil to spring-damper assemblies. The pumps 141,151 may operate at a different speed or over a different speed range in different operating states. In some examples, the noise-management control unit 180 may cause the pumps 141,151 to operate in an operating state that is based on a sound pressure level within the passenger cabin 110. For example, the noise-management control unit 180 may cause the speed of the pumps 141,151 to increase in response to an increase in the sound pressure level within the passenger cabin 100, and cause the speed of the pumps to decrease in response to a decrease in the sound pressure level. When the pumps 141,151 operate at a lower speed or lower speed range, the stiffness or the spring rate of the spring-damper assemblies may increase. A stiffer suspension may be acceptable at relatively low vehicle speeds. However, at relatively high vehicle speeds, a stiffer suspension may adversely impact ride comfort and/or road handling. Accordingly, the control units 145,155 of the suspension systems 140,150 may vary the speed of the pumps 141,151 in response to changes in the speed of the vehicle 100, irrespective of any commands received from the noise-management control unit 180. In particular, the control units 145,155 may increase the speed of the pumps 141,151 in response to an increase in vehicle speed. The control units 145,155 may increase the speed of the pumps 141,151 gradually or incrementally in response to an increase in the speed of the vehicle 100. In other examples, the control units 145,155 may increase the speed of the pumps 141,151 in one or more discrete steps. For example, the control units 145,155 may increase the speed of the pumps 141,151 in the event that the speed of the vehicle exceeds one or more speed thresholds. The same result may be achieved via the noise-management control unit 180. For example, the noise-management control unit 180 may monitor the speed of the vehicle 100 in addition to the sound pressure level within the passenger cabin 110, and cause the pumps 141,151 to operate in an operating state that depends on the sound pressure level and the vehicle speed.

The HVAC systems 120,130 of the example vehicle 100 may likewise choose to ignore or override commands from the noise-management control unit 180. For example, should the temperature of the refrigerant or coolant lie outside predefined limits, the control units 125,135 of the HVAC systems 120,130 may cause the compressors 121,131, the pumps 122,132 and/or the fans 123,133 to operate in an operating state irrespective of any commands received from the noise-management control unit 180. In another example, an occupant of the passenger cabin 110 may demand a higher flow rate from the blowers 124,134. In this instance, the control units 125,135 of the HVAC systems 120,130 may cause the blower 124,134 to operate in an operating state irrespective of any commands received from the noise-management unit 180.

Figure 3:
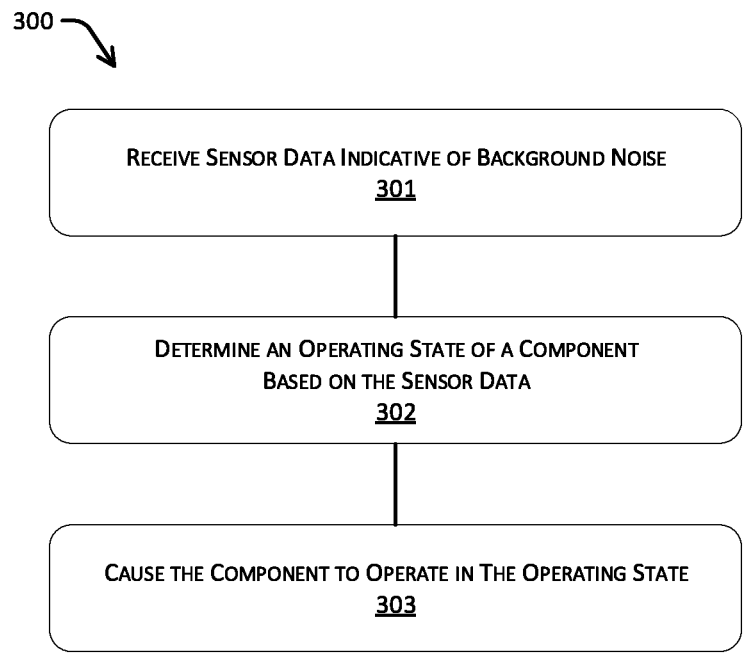
FIG. 3 is a flow diagram of an example method for managing background noise within a passenger cabin of a vehicle.

FIG. 3 illustrates an example method 300 for managing background noise within a passenger cabin of a vehicle. The method 300 may be used to implement one or more of the processes and techniques described above, particularly those performed by the noise-management control unit 180 of the example vehicle 100.

The method 300 comprises receiving 301 sensor data indicative of background noise within a passenger cabin of a vehicle. As noted above, in some examples, the sensor data may comprise a sound pressure level inside or outside the passenger cabin, which may be sensed, for example, using one or more microphones. In other examples, the sensor data may comprise a speed of vehicle, which may be sensed, for example, using a vehicle speed sensor, a wheel speed sensor, or a GPS device. In further examples, the sensor data may be an indicator of the presence or intensity of rain, which may be sensed, for example, using a rain sensor. In still further examples, the sensor data may comprise the geolocation of the vehicle, which may be sensed, for example, using lidar, cameras, radar, time-of-flight sensors, GPS device, or the like.

The method further comprises determining 302, based at least in part on the sensor data, an operating state of a component of the vehicle, and causing 303 the component to operate in the operating state. Again, as noted above, in some examples, the component may have a plurality of discrete operating states. In other examples, the component may have a continuum or continuous range of operating states. The component may generate noise within the passenger cabin of the vehicle, and the noise generated may be different when operating in different operating states. For example, the noise generated by the component may have a different sound level in different operating states. By determining the operating state of the component based, at least in part, on the sensor data, the level of background noise within the passenger cabin may be improved, thereby improving the acoustic comfort of occupants of the passenger cabin. For example, the component may be caused to operate in such a way that noise generated by the component is masked wholly or partly by other sources of background noise within the passenger cabin.

As already noted, the method 300 may implement one or more of the processes and techniques described above in connection with the example vehicle 100, particularly those processes and techniques performed by the noise-management control unit 180. Accordingly, the method 300 may comprise further steps as described above in connection with the example vehicle 100.

Figure 4:
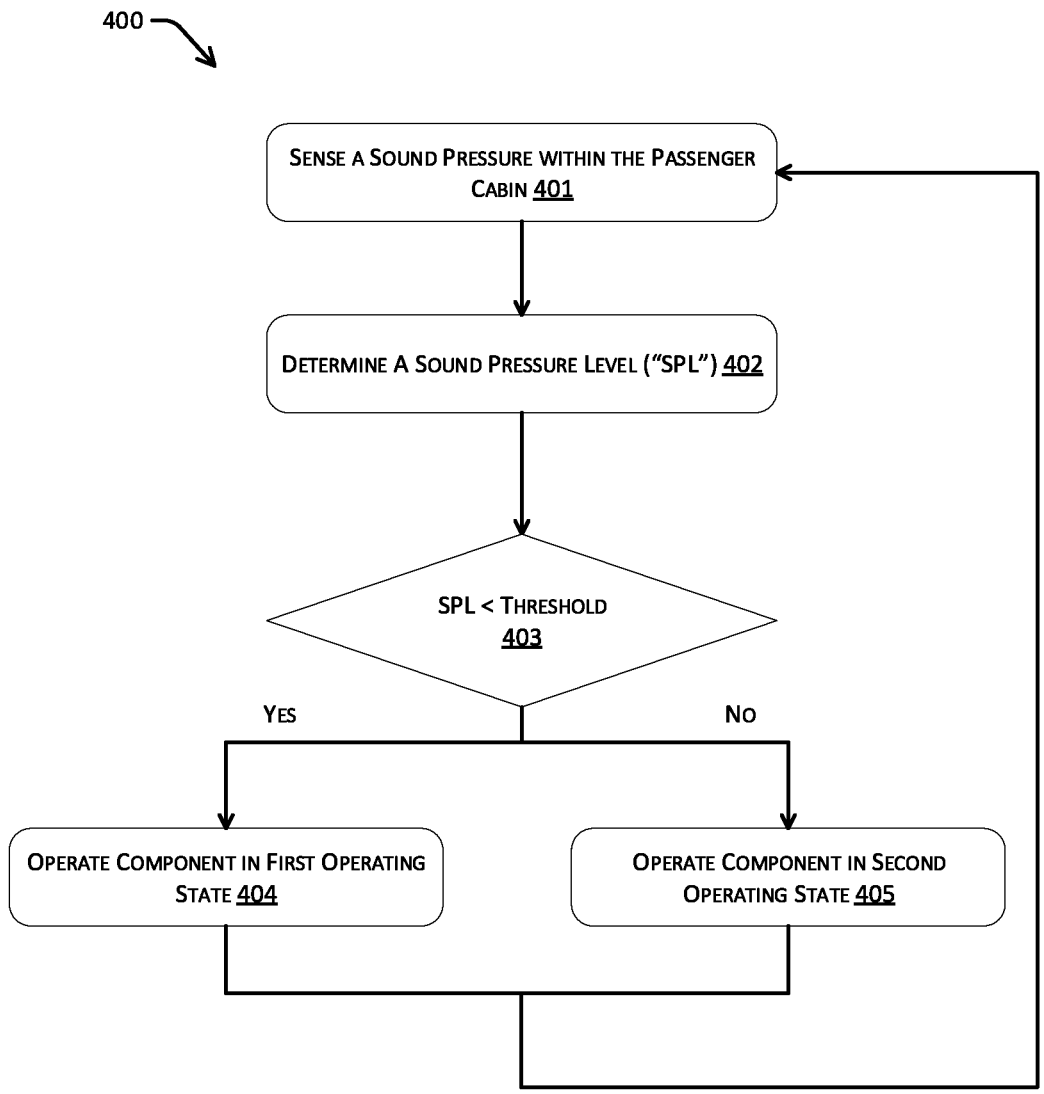
FIG. 4 is a flow diagram of an example method for managing background noise within the passenger cabin of the example vehicle of FIGS. 1 and 2.

FIG. 4 illustrates an example method for managing background noise within the passenger cabin of the example vehicle 100 of FIGS. 1 and 2. In this example method 400, a microphone of the vehicle senses 401 a sound pressure within the interior of the passenger cabin. The noise-management control unit receives audio data from the microphone, and analyzes the data to obtain a measure of the sound pressure. In the illustrated example, the noise-management control unit determines 402 a sound pressure level ("SPL") within the passenger cabin. More particularly, the noise-management control unit determines the average SPL over a range of audible frequencies, such as 20 Hz to 20 kHz. In analyzing the data, the noise-management control unit may apply a frequency weighting to the data. For example, the noise-management control unit may apply an A-weighting to the data to account for the relative loudness perceived by the human ear, which is typically less sensitive at lower frequencies.

The noise-management control unit then compares 403 the measured SPL against a threshold. In the event that the measured SPL is less than the threshold, the noise-management control unit operates 404 a component of the vehicle in a quieter first operating state. Conversely, in the event that the measured SPL is greater than the threshold, the noise-management unit operates 405 the component in a louder second operating state. The process then repeats, with the noise-management control unit continuing to monitor the SPL within the passenger cabin.

The illustrated method 400 of FIG. 4 may be used to control the components of the HVAC systems 120,130 and the suspension systems 140,150 of the example vehicle 100 of FIGS. 1 and 2. The components may operate at a first speed or over a first speed range when operating in the first operating state, and at a second higher speed or over a second higher speed range when operating in the second operating state. The components may generate noise within the passenger cabin in the different operating states, and the noise may be louder when operating in the second operating state. FIG. 5 details examples of the level of noise that may be generated by the components, as well as the maximum permissible speeds of the components, when operating in the two operating states.

Returning to the example method 400 of FIG. 4, the noise-management control unit may employ a single threshold of, say, 58 dBA. The noise-management control unit may then cause all components of the HVAC systems 120,130 and the suspension systems 140,150 to operate in their first operating states when the measured SPL is less than 58 dBA, and to operate in their second operating state when the measured SPL is greater than or equal to 58 dBA. Alternatively, the noise-management control unit may employ different thresholds for different components. By way of example, the noise-management control unit may employ a threshold of, say, 52 dBA for the fans 123,133 of the HVAC systems 120,130, and a threshold of, say, 41 dBA for the pumps 141,151 of the suspension systems 140,150.

In some examples, one or more of the components may comprise additional operating states, and the noise-management control unit may employ additional thresholds to determine the operating state of a component. In other examples, one or more of the components may comprise a continuum of operating states, and the noise-management control unit may define the operating state as a function of the measured SPL. By way of example, the maximum permissible speed of a component may be different in different operating states. Rather than having two discrete values as illustrated in the example of FIG. 5, the noise-management control unit may instead incrementally increase or decrease the maximum speed of a component in response to an increase or decrease in the measured SPL.

In the example method 400 of FIG. 4, the noise-management control unit operates 404 the component in the first operating state in the event that the measured SPL is less than a threshold. However, as noted above, the noise generated by a component when operating in the second operating state may continue to be masked by other sources of background noise when the measured SPL is less than the threshold. Accordingly, rather than causing the component to immediately transition from the louder second operating state to the quieter first operating state when the measured SPL is less than the threshold, the noise-management control unit may instead analyze the sound pressure data in order to determine if noise from the component can be discerned. For example, the noise-management control unit may determine the peak frequency in the power spectrum of the sound pressure data. The noise-management control unit may then determine that noise from the component is discernible in the event that the peak frequency satisfies a criterion. For example, the noise-management control unit may determine that noise from the component is discernible in the event that the peak frequency has a particular value or lies within a particular range of values. The noise-management control unit may then operate the component in the first operating state in the event that noise from the component is discernible. Different components may have similar noise signatures, and it may be difficult or impossible for the noise-management control unit to attribute the peak frequency in the power spectrum to one particular component. In this instance, the noise-management control unit may operate all components in the first operating state.

When the pumps 141,151 of the suspension systems 140,150 operate in the first operating state, the stiffness or spring rate of the suspension systems may increase. As noted above, whilst a stiffer suspension may be acceptable at relatively low speeds (e.g., less than 30 kph), a stiffer suspension may adversely impact ride comfort and/or road handling at relatively high speeds (e.g., greater than 30 kph). Accordingly, irrespective of the value of the measured SPL, the pumps 141,151 of the suspension systems 140,150 may operate in the second operating state in the event that that speed of the vehicle is greater than a threshold (e.g., 30 kph).

Figure 6:
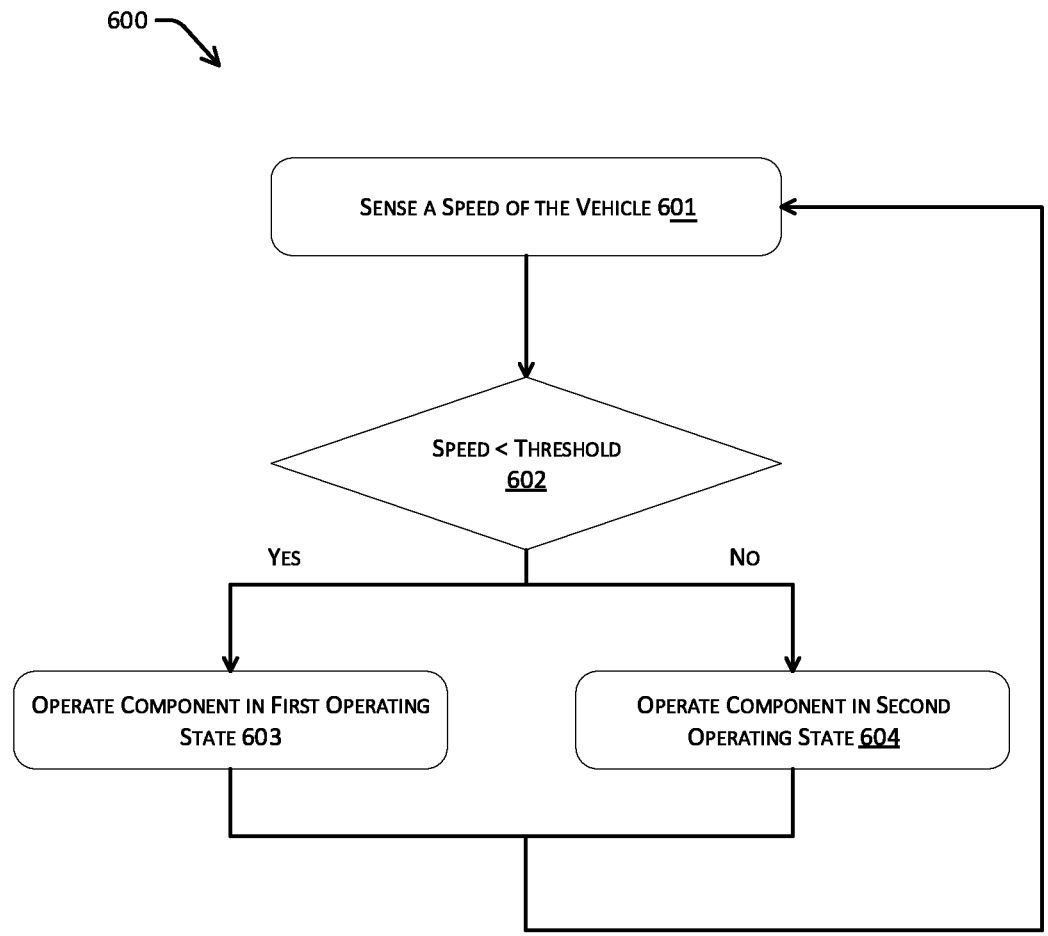
FIG. 6 is a flow diagram of an additional example method for managing background noise within the passenger cabin of the example vehicle.

100581 FIG. 6 illustrates an additional example method 600 for managing background noise within the passenger cabin of the example vehicle of FIGS. 1 and 2. In this example method 600, a speed of the vehicle is sensed 601 (e.g., using the wheel speed sensor 171). The noise-management control unit compares 602 the measured speed against a threshold. In the event that the measured speed is less than the threshold, the noise-management control unit operates 603 a component of the vehicle in a quieter first operating state. Conversely, in the event that the measured speed is greater than the threshold, the noise-management unit operates 604 the component in a louder second operating state. The process then repeats, with the noise-management control unit continuing to monitor the speed of the vehicle.

The method of FIG. 6 may be used to control the components of the HVAC systems 120,130 and the suspension systems 140,150 of the example vehicle 100. With this example vehicle, the background noise within the passenger cabin 110 may be, say, 36 dBA when the vehicle 100 is stationary. When the example vehicle 100 is travelling on a typical road surface in good weather at a speed of 40 kph, the background noise within the passenger cabin 110 may be, for example, 58 dBA. The noise-management control unit, in implementing the method 600 of FIG. 6, may therefore employ a speed threshold of 40 kph. In so doing so, the example noises generated by the components, as detailed in FIG. 5, may be masked at all times. Rather than employing a single threshold, the noise-management control unit may employ different thresholds for different components. By way of example, the noise-management control unit may employ a threshold of, say, 38 kph for the fans 123,133 of the HVAC systems 120,130, and a threshold of, say, 20 kph for the compressors 141,151 of the suspension systems 140,150.

Again, as noted above, in some examples, one or more of the components may comprise additional operating states, and the noise-management control unit may employ additional speed thresholds to determine the operating state of a component. In other examples, one or more of the components may comprise a continuum of operating states, and the noise-management control unit may define the operating state as a function of the vehicle speed. By way of example, the maximum permissible speed of a component may be different in different operating states. Rather than having two discrete values as illustrated in the example of FIG. 5, the noise-management control unit may instead incrementally increase or decrease the maximum speed of a component in response to an increase or decrease in the vehicle speed.

Figure 7:
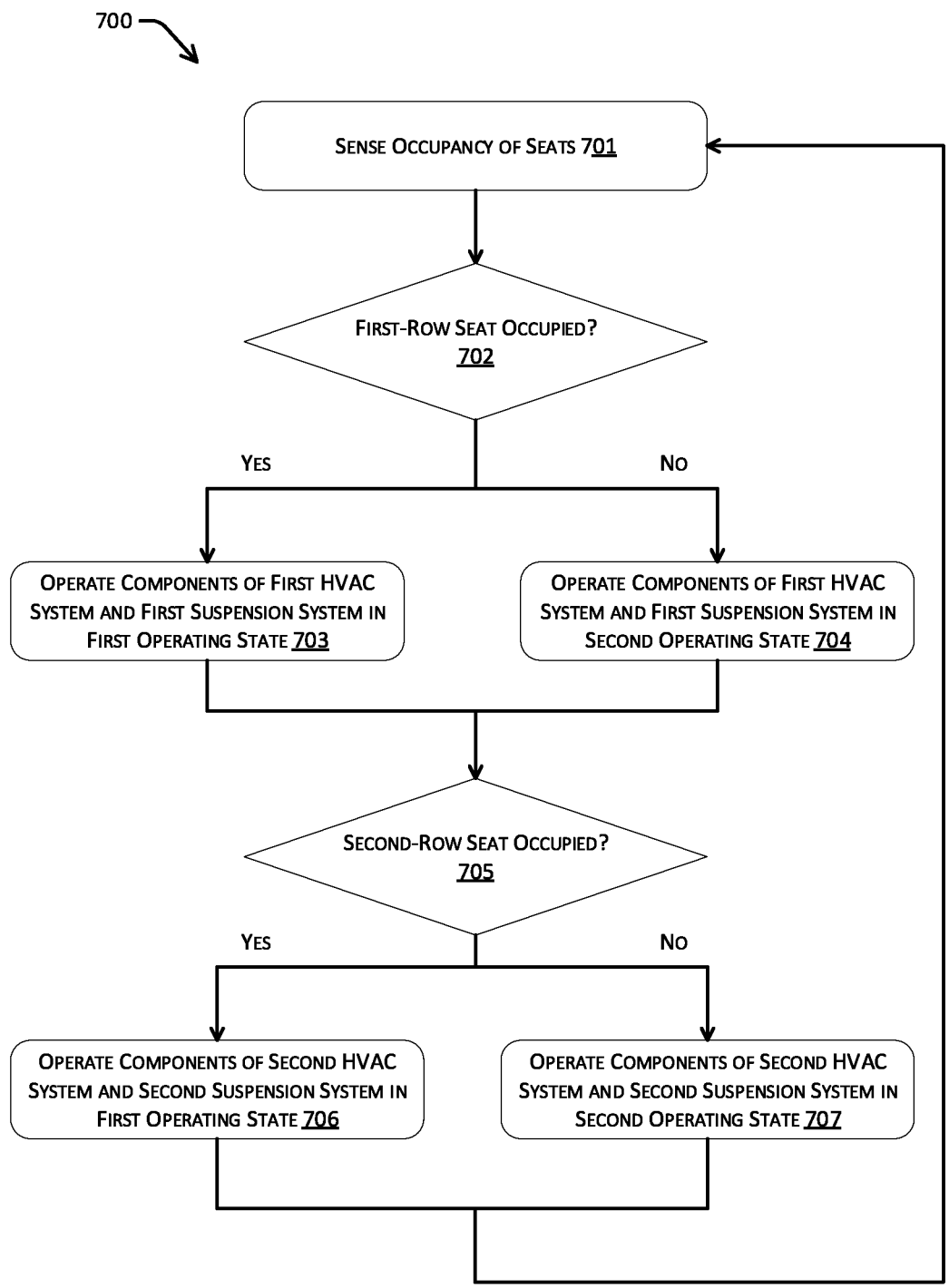
FIG. 7 is a flow diagram of a further example method for managing background noise within the passenger cabin of the example vehicle.

FIG. 7 illustrates a further example method 700 for managing background noise within the passenger cabin of the example vehicle 100 of FIGS. 1 and 2. In this example method 700, the seat occupancy sensors sense 701 the occupancy of the seats 112 of the passenger cabin 110. The noise-management unit determines 702 whether any of the seats of the first row are occupied, i.e., those seats proximate the first HVAC system 120 and the first suspension system 140. In the event that one or both of the first-row seats is occupied, the noise-management unit operates 703 the components of the first HVAC system 120 and the first suspension system 140 in a quieter first operating state. Conversely, in the event that neither of the first-row seats are occupied, the noise-management unit operates 704 the components of the first HVAC system 120 and the first suspension system 140 in a louder second operating state. The noise-management unit further determines 705 whether any of the seats of the second row are occupied, i.e., those seats proximate the second HVAC system 130 and the second suspension system 150. In the event that one or both of the second-row seats is occupied, the noise-management unit operates 706 the components of the second HVAC system 130 and the second suspension system 150 in the quieter first operating state. Conversely, in the event that neither of the second-row seats are occupied, the noise-management unit operates 707 the components of the second HVAC system 130 and the second suspension system 150 in the louder second operating state.

In other examples, one or more components of the vehicle 100 may comprise additional operating states, and the noise-management unit 180 may determine the operating state of a component based, at least in part, on a location or a proximity of an occupant relative to the component. By way of example, components of the HVAC systems 120,130 and/or the suspensions systems 140,150 may comprise four operating states, and the noise-management unit may determine an operating state for a component based on which of the four seats 112 of the vehicle 100 are occupied. In examples where the noise-management unit 180 determines the operating state of a component based on one or more thresholds (e.g., noise thresholds or speed thresholds), the occupancy of the passenger cabin may be used to determine the thresholds. For example, the thresholds for a particular component may be defined by the proximity of an occupant relative to the component. In particular, higher thresholds may be employed when an occupant of the passenger cabin is seated nearer the component.

The example vehicle 100 comprises a noise-management control unit 180 that is responsible for managing background noise within the passenger cabin 110. The noise-management control unit 180 receives data from one or more sensors 161,171,181 of the vehicle 100 and, in response, controls the operation of one or more components of the vehicle 100. The noise-management control unit 180 may transmit commands to a control unit of a system to which the component belongs, and the control unit of the system may, in response, control the operation of the component. In other examples, the control unit of a system may be directly responsible for managing the noise generated by the components of the system. For example, the control units 125,135 of the HVAC systems 120,130 and/or the control units 145,155 of the suspension systems 150,150 may receive data from the one or more sensors 161,171,181 of the vehicle 100 and, in response, control the operation of components of the system directly. This may then avoid the need for a separate noise-management control unit 180.

One or more of the control units of the vehicle 100 may be an embedded device comprising a processor, a non-transitory storage medium, and an input-output interface. The storage medium may store instructions that are executed by the processor. The storage medium of one or more of the control units may comprise instructions that, when executed, cause one or more of the processors to perform, in whole or in part, one or more of the example methods described above. In some examples, the vehicle may comprise one or more storage media storing instructions that, when executed by one or more processors, cause the processors to perform operations that comprise: receiving sensor data from a sensor associated with the vehicle, the sensor data indicative of background noise within a passenger cabin of the vehicle or an occupancy of the passenger cabin; determining, based at least in part on one or more of the background noise or the occupancy, an operating state of the component; and causing the component to operate in accordance with the operating state.

Figure 8:
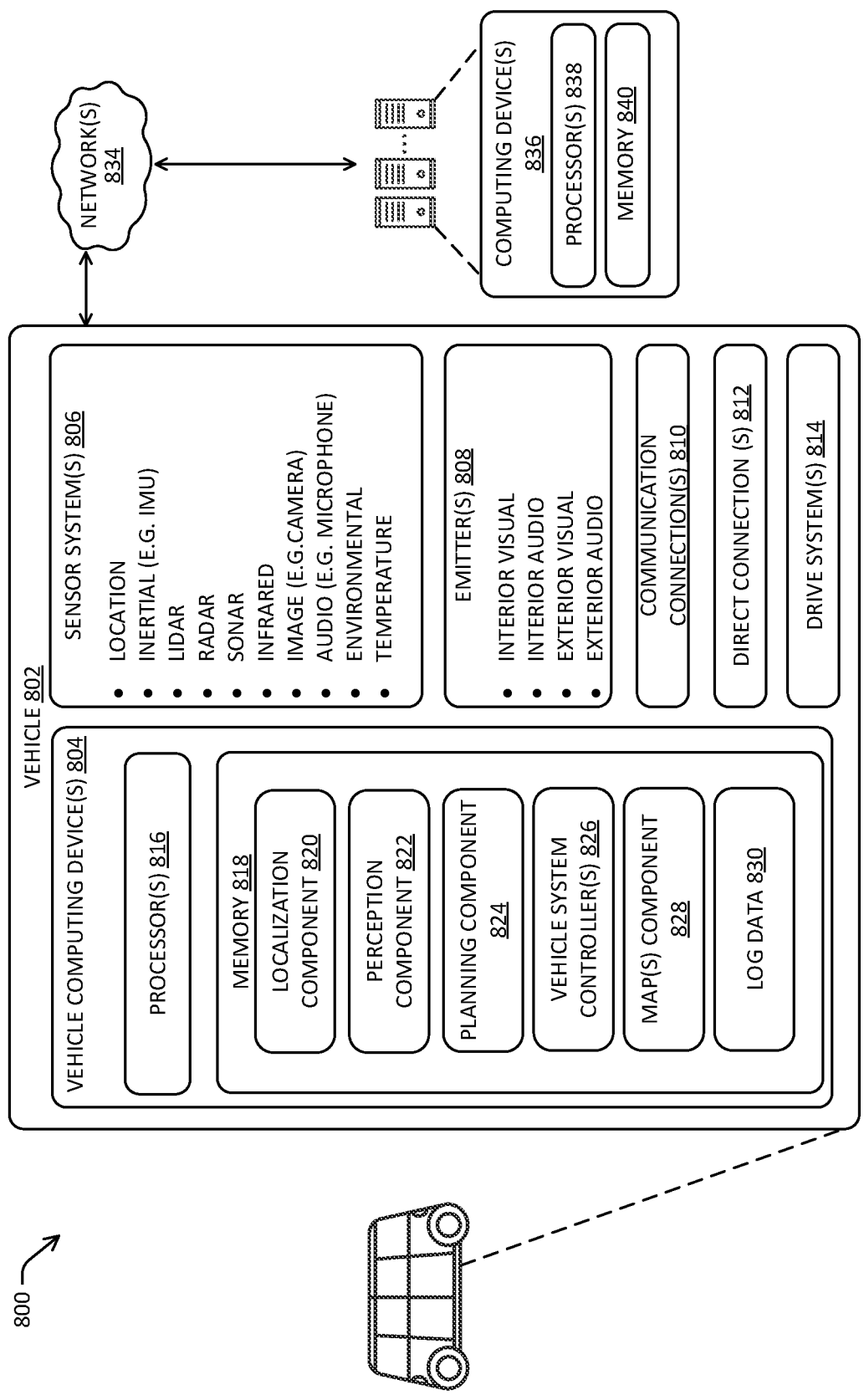
FIG. 8 is a block diagram of an example system for implementing the techniques described herein.

FIG. 8 is a block diagram illustrating an example system 800 for implementing some of the various technologies described herein. In some examples, the system 800 may include one or multiple features, components, and/or functionality of examples described herein with reference to other figures.

The system 800 may include a vehicle 802. In some examples, the vehicle 802 may include some or all of the features, components, and/or functionality described above with respect to the example vehicle 100. As shown in FIG. 8, the vehicle 802 may also include a vehicle computing device 804, one or more sensor systems 806, one or more emitters 808, one or more communication connections 810, one or more direct connections 812, and/or one or more drive systems 814.

The vehicle computing device 804 can, in some examples, include one or more processors 816 and memory 818 communicatively coupled with the one or more processors 816. In the illustrated example, the vehicle 802 is an autonomous vehicle; however, the vehicle 802 could be any other type of vehicle (e.g., automobile, truck, bus, aircraft, watercraft, train, etc.), or any other system having components such as those illustrated in FIG. 8. In examples, the one or more processors 816 may execute instructions stored in the memory 818 to perform one or more operations on behalf of the one or more vehicle computing devices 804.

The memory 818 of the one or more vehicle computing devices 804 can store a localization component 820, a perception component 822, a planning component 824, one or more system controllers 826, a map(s) component 828, and log data 830. Though depicted in FIG. 8 as residing in memory 818 for illustrative purposes, it is contemplated that the localization component 820, perception component 822, planning component 824, one or more system controllers 826, map(s) component 828, and/or the log data 830 can additionally, or alternatively, be accessible to the vehicle 802 (e.g., stored on, or otherwise accessible from, memory remote from the vehicle 802, such as memory 840 of one or more computing devices 836).

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 806 or received from one or more other devices (e.g., computing devices 836) to accurately determine a location of the autonomous vehicle 802. In some instances, the localization component 820 can provide data to various components of the vehicle 802 to determine an initial position of the autonomous vehicle 802 for generating a trajectory and/or for determining to retrieve map data. In various examples, the localization component 820 can provide data to a web-based application that may generate a data visualization associated with the vehicle 802 based at least in part on the data.

In some instances, the perception component 822 can include functionality to perform object tracking, detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional and/or alternative examples, the perception component 822 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 822 may provide data to a web-based application that generates a data visualization associated with the vehicle 802 based at least in part on the data.

In general, the planning component 824 can determine a path for the vehicle 802 to follow to traverse through an environment. For example, the planning component 824 can determine various routes and trajectories and various levels of detail. For example, the planning component 824 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 824 can generate an instruction for guiding the autonomous vehicle along at least a portion of the route from the first location to the second location. In at least one example, the planning component 824 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In at least one example, the vehicle computing device 804 can include one or more system controllers 826, which can be configured to control steering, propulsion, braking, safety, emitters, communication, components, and other systems of the vehicle 802. These system controller(s) 826 can communicate with and/or control corresponding systems of the drive assembly(s) 814 and/or other components of the vehicle 802.

The memory 818 can further include the map(s) component 828 to maintain and/or update one or more maps (not shown) that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 802 can be controlled based at least in part on the maps. That is, the maps can be used in connection with the localization component 820, the perception component 822, and/or the planning component 824 to determine a location of the vehicle 802, identify objects in an environment, and/or generate routes and/or trajectories to navigate within an environment. Additionally, the maps can be used in connection with the web-based application to generate content associated with the vehicle 802, such as a data visualization.

In some examples, the one or more maps can be stored on a remote computing device(s) (such as the computing device(s) 836) accessible via one or more network(s) 834. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 818 may also store log data 830 associated with the vehicle. For instance, the log data 830 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 830.

In some instances, aspects of some or all of the memory-stored components discussed herein can include any models, algorithms, and/or machine learning algorithms. For example, in some instances, components in the memory 818 (and the memory 840, discussed in further detail below) such as the localization component 820, the perception component 822, and/or the planning component 824 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering, association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 806 can include multiple instances of each of these or other types of sensors. For instance, the lidar sensors can include individual lidar sensors located at the corners, front, back, sides, and/or top of the vehicle 802. As another example, the image sensors can include multiple image sensors disposed at various locations about the exterior and/or interior of the vehicle 802. As an even further example, the audio sensors can include multiple audio sensors disposed at various locations about the exterior and/or interior of the vehicle 802. Additionally, the audio sensors can include an array of a plurality of audio sensors for determining directionality of audio data. The sensor system(s) 806 can provide input to the vehicle computing device 804. Additionally, or alternatively, the sensor system(s) 806 can send sensor data, via the one or more networks 834, to the one or more computing device(s) 836 at a particular frequency, after a lapse of a predetermined period of time, in near real-time, etc.

The vehicle 802 can also include one or more emitters 808 for emitting light and/or sound. The emitters 808 in this example include interior audio and visual emitters to communicate with occupants of the vehicle 802. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive system(s) 814. Also, the communication connection(s) 810 can allow the vehicle 802 to communicate with other nearby computing device(s) (e.g., other nearby vehicles, traffic signals, laptop computer etc.). The communications connection(s) 810 also enable the vehicle 802 to communicate with a remote teleoperations system or other remote services.

The communications connection(s) 810 can include physical and/or logical interfaces for connecting the vehicle computing device(s) 804 to another computing device (e.g., computing device(s) 836) and/or a network, such as network(s) 834. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 812 of vehicle 802 can provide a physical interface to couple the one or more drive system(s) 814 with the body of the vehicle 802. For example, the direct connection 812 can allow the transfer of energy, fluids, air, data, etc. between the drive assembly(s) 814 and the vehicle 802. In some instances, the direct connection 812 can further releasably secure the drive assembly(s) 814 to the body of the vehicle 802.

In at least one example, the vehicle 802 can include one or more drive assemblies 814. In some examples, the vehicle 802 can have a single drive assembly 814. In at least one example, if the vehicle 802 has multiple drive assemblies 814, individual drive assemblies 814 can be positioned on opposite longitudinal ends of the vehicle 802 (e.g., the leading and trailing ends, the front and the rear, etc.).

The drive system(s) 814 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include one or more drive system controllers which can receive and preprocess data from the sensor system(s) and to control operation of the various vehicle systems. In some examples, the drive system controller(s) can include one or more processors and memory communicatively coupled with the one or more processors. The memory can store one or more systems to perform various functionalities of the drive system(s) 814. In examples, the drive system controller(s) may manage background noise within a passenger cabin of the vehicle 802 using one or more of the techniques, features and/or functionality described above and illustrated in the other figures. Furthermore, the drive assembly(s) 814 may also include one or more communication connection(s) that enable communication by the respective drive assembly with one or more other local or remote computing device(s).

The computing device(s) 836 can include one or more processors 838 and memory 840 that may be communicatively coupled to the one or more processors 838. In some examples, the computing device(s) 836 may be associated with a teleoperations system that remotely monitors a fleet of vehicles. Additionally, or alternatively, the computing devices(s) 836 may be leveraged by the teleoperations system to receive and/or process data on behalf of the teleoperations system.

The processor(s) 816 of the vehicle 802 and the processor(s) 838 of the computing device(s) 836 can be any suitable processor capable of executing instructions to process data and perform operations as described herein. By way of example and not limitation, the processor(s) 816 and 838 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 840 are examples of non-transitory computer-readable media. The memory 818 and 840 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components of the vehicle 802 of FIG. 8 are described herein as divided for illustrative purposes. However, the operations performed by the various components can be combined or performed in any other component. It should be noted that while FIG. 8 is illustrated as a distributed system, in alternative examples, components of the vehicle 802 can be associated with the computing device(s) 836 and/or components of the computing device(s) 836 can be associated with the vehicle 802. That is, the vehicle 802 can perform one or more of the functions associated with the computing device(s) 836, and vice versa.

Example Clauses

A. A vehicle comprising a passenger cabin; a sensor; a component; one or more processors; and one or more non-transitory computer readable media having instructions stored thereon which, when executed by the one or more processors, perform operations comprising: receiving sensor data from the sensor, the sensor data indicative of one or more of a background noise within the passenger cabin or an occupancy of the passenger cabin; determining, based at least in part on one or more of the background noise or the occupancy, an operating state of the component; and causing the component to operate in accordance with the operating state, wherein the component generates noise having a different sound level within the passenger cabin in different operating states.

B. The vehicle as paragraph A describes, wherein: the sensor data comprises a sound level inside the passenger cabin; the operations further comprise receiving additional data comprising one or more of: a sound level outside the passenger cabin, a speed of the vehicle, an intensity of rain falling on the vehicle, or a geolocation of the vehicle; and determining the operating state is further based at least in part on the additional data.

C. The vehicle as paragraph A describes, wherein the sensor comprises a plurality of microphones positioned inside and outside of the passenger cabin.

D. The vehicle as paragraph A describes, wherein the sensor data comprises a measure indicative of the background noise, and determining the operating state comprises: performing a comparison of the measure against a threshold; and determining the operating state based at least in part on the comparison.

E. The vehicle as paragraph A describes, wherein determining the operating state comprises: determining, based on the occupancy, one or more of: that the vehicle is occupied by an occupant, a location of the occupant, that the occupant is seated proximate the component, or a preferred noise level for the occupant; and determining the operating state such that the noise generated by the component has a sound level at the occupant that is less than or equal to a threshold noise level.

F. The vehicle as paragraph A describes, wherein the component comprises one of a compressor, a pump, a fan, or a blower, and the operating state comprises a speed or a speed range of the component.

G. A method comprising: receiving sensor data from a sensor associated with a vehicle, the sensor data indicative of background noise within a passenger cabin of the vehicle; determining, based at least in part on the sensor data, an operating state of a component of the vehicle; and causing the component to operate in the operating state, wherein the component generates noise having a different sound level within the passenger cabin in different operating states.

H. The method as paragraph G describes, wherein: the sensor data comprises a sound level inside the passenger cabin; and the method further comprises receiving additional data comprising one or more of: a sound level outside the passenger cabin, a speed of the vehicle, an intensity of rain falling on the vehicle, or a geolocation of the vehicle; and determining the operating state is further based at least in part on the additional data.

I. The method as paragraph G describes, wherein the sensor data comprises a measure indicative of the background noise, and determining the operating state of the component comprises: performing a comparison of the measure against a threshold; and determining the operating state based at least in part on the comparison.

J. The method as paragraph G describes, wherein determining the operating state of the component comprises: determining a peak frequency in the background noise; and determining the operating state based at least in part on the peak frequency.

K. The method as paragraph G describes, further comprising receiving additional data indicative of an occupancy of the passenger cabin, wherein determining the operating state is further based at least in part on the occupancy.

L. The method as paragraph G describes, further comprising determining, based at least in part on the occupancy, a location of an occupant within the passenger cabin, wherein determining the operating state comprises: determining that the occupant is located proximate the component; and determining the operating state to reduce a level of noise generated by the component.

M. The method as paragraph L describes, further comprising: determining an identity of an occupant of the passenger cabin; and determining, based at least in part on the identity, a desired noise profile, wherein determining the operating state comprises determining the operating state such that the background noise is less than or equal to the desired noise profile.

N. The method as paragraph G describes, wherein the component comprises one of a compressor, a pump, a fan, or a blower.

O. The method as paragraph N describes, wherein the operating state comprises a speed or a speed range of the component.

P. The method as paragraph G describes, further comprising determining a drive mode of the vehicle, wherein determining the operating state is further based at least in part on the drive mode, and the noise generated by the component in different drive modes has a different noise profile.

Q. One or more non-transitory computer-readable media storing instructions executable by one or more processors, wherein the instructions, when executed, cause the one or more processors to perform operations comprising: receiving sensor data from a sensor associated with a vehicle, the sensor data indicative of a background noise within a passenger cabin of the vehicle or an occupancy of the passenger cabin; determining, based at least in part on one or more of the background noise or the occupancy, an operating state of the component; and causing the component to operate in accordance with the operating state, wherein the component generates noise having a different sound level within the passenger cabin in different operating states.

R. The one or more non-transitory computer-readable media as paragraph Q describes, wherein: the sensor data comprises a sound level inside the passenger cabin; the operations further comprise receiving additional data comprising one or more of: a sound level outside the passenger cabin, a speed of the vehicle, an intensity of rain falling on the vehicle, or a geolocation of the vehicle; and determining the operating state is further based at least in part on the additional data.

S. The one or more non-transitory computer-readable media as paragraph Q describes, wherein the sensor data comprises a measure indicative of the background noise, and determining the operating state comprises: performing a comparison of the measure against a threshold; and determining the operating state based at least in part on the comparison.

T. The one or more non-transitory computer-readable media as paragraph Q describes, wherein the component comprises one of a compressor, a pump, a fan, or a blower, and the operating state comprises a speed or a speed range of the component.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A vehicle comprising:
    a passenger cabin;
    sensors;
    a component;
    one or more processors; and
    one or more non-transitory computer readable media having instructions stored thereon which, when executed by the one or more processors, perform operations comprising:
        receiving sensor data from the sensors, the sensor data indicative of a background noise within the passenger cabin and an occupancy of the passenger cabin;
        determining, based at least in part on the background noise and the occupancy, an operating state of the component; and
        causing the component to operate in accordance with the operating state, wherein the component generates noise having a different sound level within the passenger cabin in different operating states.

2. The vehicle of claim 1, wherein:
    the sensor data comprises a sound level inside the passenger cabin;
    the operations further comprise receiving additional data comprising one or more of:
        a sound level outside the passenger cabin,
        a speed of the vehicle,
        an intensity of rain falling on the vehicle, or
        a geolocation of the vehicle; and
    determining the operating state is further based at least in part on the additional data.

3. The vehicle of claim 1, wherein the sensor comprises a plurality of microphones positioned inside and outside of the passenger cabin.

4. The vehicle of claim 1, wherein the sensor data comprises a measure indicative of the background noise, and determining the operating state comprises:
    performing a comparison of the measure against a threshold; and
    determining the operating state based at least in part on the comparison.

5. The vehicle of claim 1, wherein determining the operating state comprises:
  determining, based on the occupancy, one or more of:
    that the vehicle is occupied by an occupant,
    a location of the occupant,
    that the occupant is seated proximate the component, or
    a preferred noise level for the occupant; and
  determining the operating state such that the noise generated by the component has a sound level at the occupant that is less than or equal to a threshold noise level.

6. The vehicle of claim 1, wherein the component comprises one of a compressor, a pump, a fan, or a blower, and the operating state comprises a speed or a speed range of the component.

7. A method comprising:
  receiving sensor data from a-sensors associated with a vehicle, the sensor data indicative of background noise within a passenger cabin of the vehicle and occupancy of the passenger cabin;
  determining, based at least in part on the sensor data, an operating state of a component of the vehicle; and
  causing the component to operate in the operating state, wherein the component generates noise having a different sound level within the passenger cabin in different operating states.

8. The method of claim 7, wherein:
  the sensor data comprises a sound level inside the passenger cabin; and
  the method further comprises receiving additional data comprising one or more of:
    a sound level outside the passenger cabin,
    a speed of the vehicle,
    an intensity of rain falling on the vehicle, or
    a geolocation of the vehicle; and
  determining the operating state is further based at least in part on the additional data.

9. The method of claim 7, wherein the sensor data comprises a measure indicative of the background noise, and determining the operating state of the component comprises:
  performing a comparison of the measure against a threshold; and
  determining the operating state based at least in part on the comparison.

10. The method of claim 7, wherein determining the operating state of the component comprises:
  determining a peak frequency in the background noise; and
  determining the operating state based at least in part on the peak frequency.

11. The method of claim 7, further comprising receiving additional data indicative of an occupancy of the passenger cabin, wherein determining the operating state is further based at least in part on the occupancy.

12. The method of claim 11, further comprising determining, based at least in part on the occupancy, a location of an occupant within the passenger cabin,
  wherein determining the operating state comprises:
    determining that the occupant is located proximate the component; and
    determining the operating state to reduce a level of noise generated by the component.

13. The method of claim 11, further comprising:
  determining an identity of an occupant of the passenger cabin; and
  determining, based at least in part on the identity, a desired noise profile,
  wherein determining the operating state comprises determining the operating state such that the background noise is less than or equal to the desired noise profile.

14. The method of claim 7, wherein the component comprises one of a compressor, a pump, a fan, or a blower.

15. The method of claim 14, wherein the operating state comprises a speed or a speed range of the component.

16. The method of claim 7, further comprising determining a drive mode of the vehicle, wherein determining the operating state is further based at least in part on the drive mode, and the noise generated by the component in different drive modes has a different noise profile.

17. One or more non-transitory computer-readable media storing instructions executable by one or more processors, wherein the instructions, when executed, cause the one or more processors to perform operations comprising:
  receiving sensor data from sensors associated with a vehicle, the sensor data indicative of a background noise within a passenger cabin of the vehicle and an occupancy of the passenger cabin;
  determining, based at least in part on the background noise and the occupancy, an operating state of the component; and
  causing the component to operate in accordance with the operating state, wherein the component generates noise having a different sound level within the passenger cabin in different operating states.

18. The one or more non-transitory computer-readable media of claim 17, wherein:
  the sensor data comprises a sound level inside the passenger cabin;
  the operations further comprise receiving additional data comprising one or more of:
    a sound level outside the passenger cabin,
    a speed of the vehicle,
    an intensity of rain falling on the vehicle, or
    a geolocation of the vehicle; and
  determining the operating state is further based at least in part on the additional data.

19. The one or more non-transitory computer-readable media of claim 17, wherein the sensor data comprises a measure indicative of the background noise, and determining the operating state comprises:
  performing a comparison of the measure against a threshold; and
  determining the operating state based at least in part on the comparison.

20. The one or more non-transitory computer-readable media of claim 17, wherein the component comprises one of a compressor, a pump, a fan, or a blower, and the operating state comprises a speed or a speed range of the component.

* * * * *